UNITED STATES PATENT OFFICE.

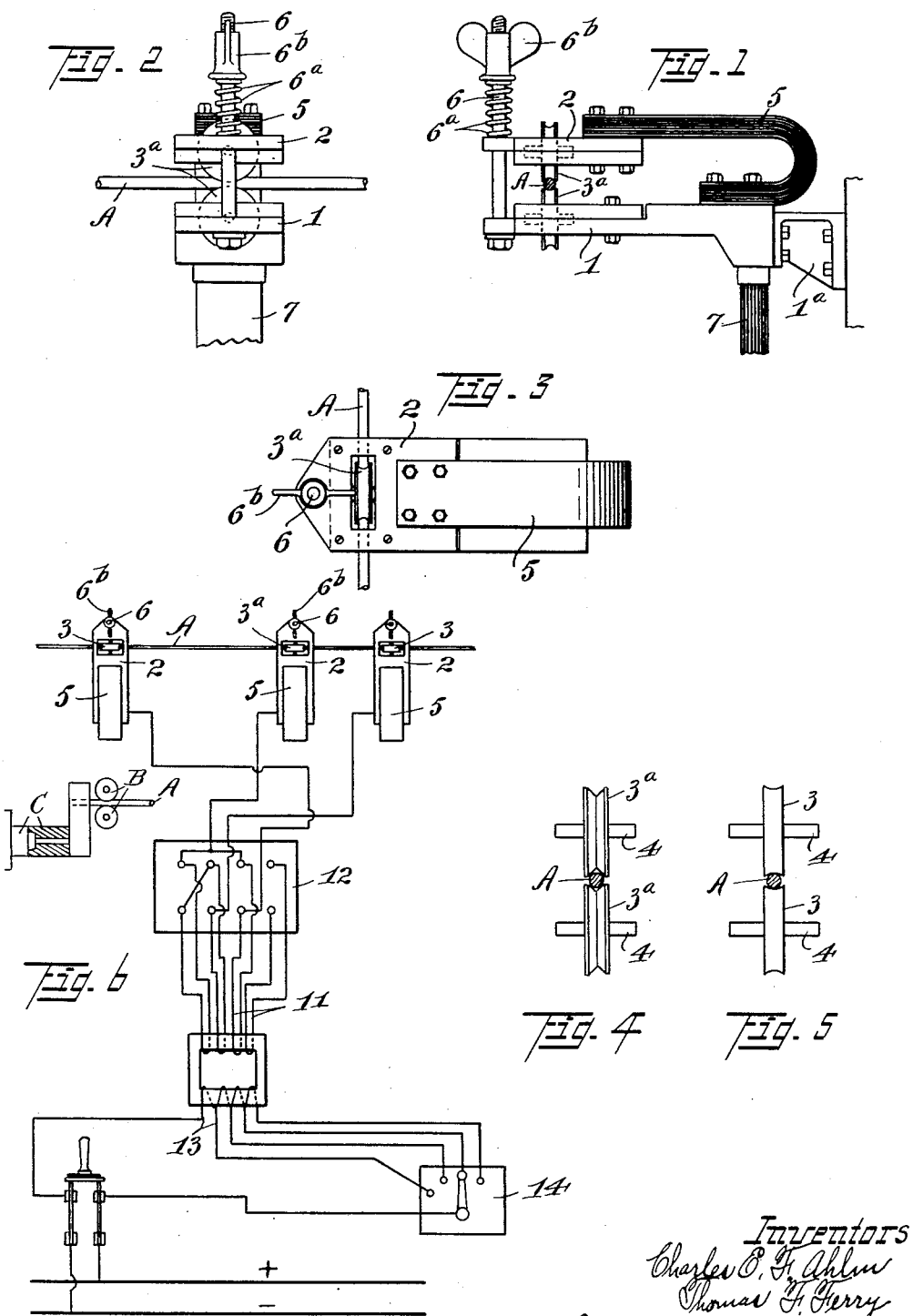

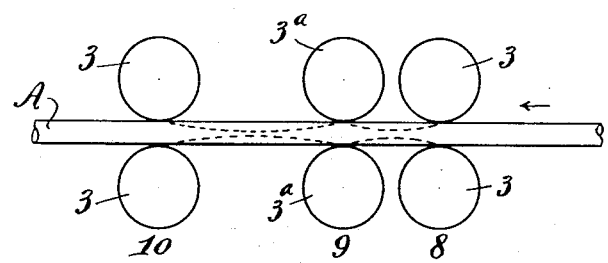
Fig-7
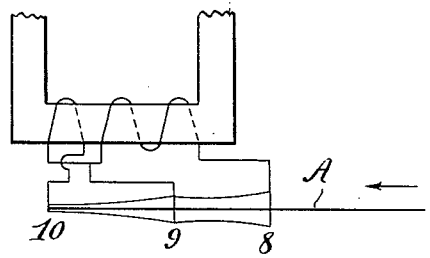
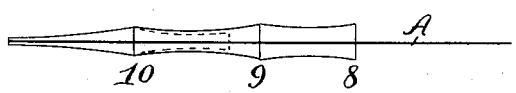
Fig-8

CHARLES E. F. AHLM AND THOMAS F. FERRY, OF CLEVELAND, OHIO.

HEATING APPARATUS FOR METAL-WORKING MACHINES.

1,400,846.   Specification of Letters Patent.   Patented Dec. 20, 1921.

Application filed May 7, 1920. Serial No. 379,489.

*To all whom it may concern:*

Be it known that we, CHARLES E. F. AHLM and THOMAS F. FERRY, citizens of the United States, residing at Cleveland, in the county of Cuyahoga and State of Ohio, have invented certain new and useful Improvements in Heating Apparatus for Metal-Working Machines, of which the following is a specification.

This invention relates to improvements in electric heating apparatus for metal working machines, the present embodiment of the invention being particularly designed and adapted for use in connection with that type or class of machines known as "upsetting or heading machines," used in connection with the upsetting or heading of blanks for forming cap screws, set screws, and the like, such for example as that shown and claimed in Ferry Reissue Patent No. 14,384, of October 30, 1917.

The primary object of the invention is to provide improved means for electrically heating the stock or material while being fed into such machine, whereby the stock or bar will not only be quickly and uniformly heated but will be delivered at a proper temperature to the heading or upsetting dies, thereby not only greatly facilitating the work and prolonging the life of the dies but improving the finished product resulting therefrom, as compared with the ordinary cold process. This is particularly true where it is desired to use a somewhat imperfect stock of material or it is desired to form the same of certain alloy steel.

A still further object is the provision of improved means for delivering the heating current to and passing the same through the stock or wire preparatory to being operated upon.

A still further and very important object of the invention is the provision of improved means for pre-heating and heating the stock or wire in suitable lengths or sections corresponding approximately to the blanks cut-off and formed in the blanking and upsetting operations.

A still further and very important object of the invention is the provision of improved heating electrodes, together with improved means for mounting and electrically connecting the same and for regulating and controlling the current passing therethrough and through the material being heated.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1 is a side elevation of a set or pair of heating electrodes mounted and secured in accordance with this invention.

Fig. 2, a front elevation of the same.

Fig. 3, a top plan view of the same.

Fig. 4, a view of the rotatably mounted heating electrodes, detached, and illustrating in particular the four points of contact with the interposed stock of wire to be heated.

Fig. 5, a view illustrating a modified form of rotary heating electrodes in which only two points of contact are provided.

Fig. 6, a diagrammatic view showing the various electric circuits and connections, and also illustrating somewhat diagrammatically the upsetting dies and wire feeding rolls of an ordinary upsetting machine.

Fig. 7, a diagrammatic view illustrating the relative arrangement of the sets of heating electrodes with respect to the interposed stock or wire to be heated, the dotted lines indicating the flow of current through the latter and between such electrodes.

Fig. 8, a diagrammatic view illustrating the relative positions of the heating electrodes and the successive working positions of the wire while passing therethrough, the heat in the wire being shown by light lines at either side of the same, and the four positions and resulting heat conditions being shown for the purpose of illustration.

Similar numerals of reference designate like parts throughout all the figures of the drawings.

The terminals or electrode holders, 1 and 2, may be mounted and secured to the frame of the machine in any suitable and convenient manner, as for example,—by means of brackets, 1ª. The holders, 1 and 2, may be water-cooled in any suitable and convenient manner, and are provided with suitable electrodes, 3 and 3ª, rotatably mounted by means of bearings, 4, the latter together with the wheel-shaped electrodes, 3 and 3ª, being adapted to have a limited lateral movement longitudinally of the bearings for the purpose of allowing the grooved wheel or roller electrodes to have a limited movement for adjusting themselves to slight variations or inequalities in the stock of material or wire, A, to be heated.

In view of the specific character of the machine with which this invention is illustrated for the purpose of an example, the stock of material to be heated will be hereinafter referred to as the "wire."

The wire, A, to be heated may be fed in the usual manner in connection with machines of this class, as for example,—by means of suitable feed wheels or rolls, B, suitably connected and geared for intermittent operation in properly timed relation to the blanking and forming dies, C, of an ordinary upsetting machine as diagrammatically illustrated in Fig. 6 of the drawings.

The wire, A, to be heated is fed between the rotatably mounted electrodes, 3 and 3ª, necessary pressure being secured by the arrangement of the stud bolt, 6, spring, 6ª, and thumb screw, 6ᵇ, in conjunction with the flexible spring copper connection, 5. By reason of this construction, the wheel electrodes, 3 and 3ª, are resiliently held in contact with the wire for adjusting themselves to various inequalities or variations in the latter, the stud bolt, 6, and spring and thumb screw, 6ª and 6ᵇ, also acting as guides in keeping the roller electrodes in line with the wire and parallel with the same. The flexible copper connections also serve to electrically connect the terminals or electrodes, 1 and 2, together with the rotatable electrodes, 3 and 3ª, thereby electrically connecting the latter in parallel and the current, for example,—passing through the cable, 7, is divided, some of which passes through the lower holders, 1, and lower electrodes, 3 and 3ª, into the wire and other parts through the flexible connections, 5, and through the upper holders, 2, and upper electrodes, 3 and 3ª. In this manner the heating current enters the wire on diametrically opposite sides. The electrodes, 3 and 3ª, are preferably of the shape shown in Fig. 4, or of the shape shown in Fig. 5, and in either instance are rotatably mounted.

It will be seen that in the specific form shown in Fig. 4, the current from each set of electrodes will enter the wire at four points, while in Fig. 5 the current will enter at but two points.

Upon reference to Fig. 7 of the drawing, it will be seen upon reference to the dotted lines that the flow of the electric heating current will be as indicated, the three sets of electrodes being represented as to relative positions by the numerals, 8, 9 and 10, the numeral 9 indicating the middle or intermediate sets of electrodes, 3ª, and it will be thus seen that the current entering the wire through the two rotatable electrodes, 3ª, and positioned at 9, will enter and pass through the wire leaving the latter in the other or end sets of electrodes at the positions 8 and 10. This arrangement of conducting the heating current into, through and from the wire through the improved form and arrangement of the electrodes, results in uniformly and efficiently heating such wire, it being understood that the wire is moved intermittently or through working impulses imparted to the same through the feed wheels or rolls, B, the length of movement of the wire in machines of this kind being approximately that of the length of the blank to be cut and required to form the bolt or cap screw when upset.

In view of the above, and in order to accomplish the desired heating, the three sets of electrodes are employed and arranged as indicated in Fig. 7 of the drawing. It will be seen that the electrodes, 9 and 10, are spaced apart a distance corresponding to the length of wire which is to be cut off and upset, while the electrodes positioned at 8 and 9 are spaced a shorter distance apart. The connections of the electrode sets to the transformer furnishing the heating current is such that the voltage between the electrodes positioned at 9 and 10 is less and opposite in direction to that between 9 and 8, assuming, in this connection, that the movement of the wire is in the direction of the arrow or from the position 8 to 10. The required voltages to be used will depend on the relative distances between the points 9 and 10, and 9 and 8, or primarily on the length of the wire to be cut off and upset.

As a means of regulating the voltages between 9 and 10, and between 9 and 8 to the desired amount, the transformer secondary embodies a number of coils, 11, whose terminals are brought to a connecting board, 12, so arranged that one or more of these coils may be connected with the electrode sets positioned at 8, 9 and 10. Further regulation of this voltage may then be effected by cutting "in" or "out" of turns in the primary winding, 13, of the transformer by means of the connecting board, 14, and switch arm, 14ª, in the usual and well known manner.

It will thus be apparent that as the voltage between 8 and 9 is greater than the voltage between 9 and 10, and the distance between 8 and 9 is less than the distance between 9 and 10, the heating current flowing in the wire between 8 and 9 will be much greater than that flowing between 9 and 10, and accordingly the wire between 8 and 9 will be heated quicker and to a much greater extent than the wire between 9 and 10. This is what is referred to herein as "pre-heating" the wire as it moves along from the position 8 to the position 10. This pre-heating and the result of same is best explained upon reference to Fig. 8 of the drawing.

In Fig. 8 of the drawing only the secondary winding of the transformer is shown and only three coils of such winding, two of these coils being connected between the points 8 and 9 of the wire, A, and the third coil between the points 9 and 10. The wire moves in the direction of the arrow, or from 8 to 10, each movement corresponding to the distance between 9 and 10.

It will be seen that in the first position the wire is heavily heated between 8 and 9, while between 9 and 10 it is heated to a considerably less extent; the heat at position 9, however, will be greatest, even somewhat greater than at position 10 on account of the cold part of the wire to the right of the position 8 which will take up some of the heat through conduction. In the parts 9 and 10, the wire will be heated highest at the position 9, gradually getting lower toward the position 10, the heat being the lowest at the latter position. In the second position below, in Fig. 8, the wire has moved along a further distance equal to the distance between 9 and 10. The old point or position 10 is now at 10$^a$, and the old point or position 9 is now at the new point or position 10, and the old point 8 is now at 9$^a$ between the new points 9 and 10, that is to say,—between the original points or positions 9 and 10. The cold wire between 8 and 9 will heat heavily as before, while the wire between 9 and 10 will also be heavily heated. The cold part between 9 and 9$^a$ will receive heat by conduction, both from the point 9 and from the hot part 10 and 9$^a$ of the wire. This would lower the heat in the whole part of the wire between the new points or positions 9 and 10 if it were not for the additional heating current from the transformer flowing between 9 and 10. This current not only raises the heat of the wire, between 9 and 10, to that in the part 8 and 9, but may be adjusted to raise it even higher if desirable. The third and fourth positions of the wire are repetitions of the second position shown.

As the wire to the left of the position 10 gradually cools as it moves along, the amount of heat between the points 9 and 10, and 9 and 8, has been so adjusted that when the wire reaches the upsetting die the heat in the same is of the temperature desired. Thus it follows that by the use of this pre-heating arrangement the wire may be moved quickly and at the same time sufficient heat is maintained therein so that the proper temperature will remain when it reaches the upsetting die.

If necessary or desirable, a fourth or more sets of electrodes may be added to the right of 8, so as to pre-heat a larger part of the wire and for a longer time. A switch, 15, is connected in the primary circuit of the transformer, and may be mechanically or electrically connected with the wire actuating machinery in such a manner that it will automatically close as soon as such machinery is set in motion, and remain in such closed position until the wire actuating machinery stops, whereupon the switch will automatically open and disconnect the transformer from the supply circuit. In this manner if the wire actuating machinery should accidentally stop, the heating current is automatically cut off and all danger from over-heating and melting of the wire prevented.

Having thus described one of the embodiments of this invention, without having attempted to set forth all the forms in which it may be made or all the modes of its use, what is claimed, is,—

1. In an electric heating device, a plurality of superposed electrodes spaced unequal distances apart longitudinally and at opposite sides of the pathway of the material to be heated passed therebetween.

2. In an electric heating device, rotatably mounted electrodes arranged in pairs and spaced unequal distances apart longitudinally of the material interposed between said electrodes.

3. In an electric heating device for metal working machines, a plurality of superposed feed and return electrodes mounted in opposite positions longitudinally of the pathway of the material to be heated, and spaced apart unequal distances.

4. An electric heating device, comprising an electric transformer and a plurality of longitudinally spaced superposed wheel electrodes and resiliently connected electrode holders connected therewith, and means for regulating and adjusting relative voltages of current passing through the sections of material passed between said electrodes and for "preheating" the same.

5. In an electric heating apparatus for metal working machines, means for intermittently feeding the material, means for heating said material comprising grooved roller electrodes rotatably mounted in opposite relation longitudinally of the material being fed, and means for regulating the current passing through said electrodes and sections of material therebetween.

6. In an electric heating device for metal working machines, superposed feed and return grooved wheel electrodes mounted in opposing positions longitudinally of the material to be heated and spaced apart unequal distances, and means for intermittently moving said material a distance corresponding to the longitudinal space between some of said electrodes.

7. In an electric heating device for metal working, including a wire to be heated, superposed heating electrodes arranged in pairs and spaced apart longitudinally unequal distances along said wire forming unequal sections to be heated therebetween, and means for regulating the respective voltages applied to the sections of material passing between said electrodes and for "pre-heating" the initial section thereof.

8. In an electric heating apparatus for metal working, the combination with a metal working device and a supply wire therein; of feed and return grooved wheel electrodes engaging said wire at diametrically opposite sides and spaced longitudinally thereof unequal distances forming unequal sections to be heated, secondary circuits including said electrodes and unequal sections of wire, and means for energizing said secondary circuits and regulating the relative voltages passing therethrough.

9. A heating apparatus for metal working machines, comprising a plurality of superposed rotatably mounted feed and return electrodes mounted longitudinally of and on opposite sides of the pathway of the material to be heated, a transformer connected therewith, and means for regulating the voltages of heating current applied to the respective sections of material passing between said electrodes.

10. In an electric heating apparatus for metal working, the combination with a metal working device and a supply of material to be heated; of intermediate feed electrodes and return end electrodes engaging said supply of material at diametrically opposite sides thereof, secondary circuits including said electrodes and supply of material, a primary circuit for energizing said secondary circuits, means for intermittently feeding said blank between said electrodes, and means for closing and opening said primary circuit with the starting and stopping of said blank feeding mechanism of said machine.

In testimony whereof we have affixed our signatures.

CHARLES E. F. AHLM.
THOMAS F. FERRY.